United States Patent
Habu

(10) Patent No.: US 10,688,994 B2
(45) Date of Patent: *Jun. 23, 2020

(54) VEHICLE CONTROL APPARATUS

(71) Applicant: DENSO CORPORATION, Kariya, Aichi-pref. (JP)

(72) Inventor: Toshiya Habu, Nishio (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 22 days.

This patent is subject to a terminal disclaimer.

(21) Appl. No.: 16/042,246

(22) Filed: Jul. 23, 2018

(65) Prior Publication Data

US 2018/0326986 A1 Nov. 15, 2018

Related U.S. Application Data

(63) Continuation of application No. 15/258,886, filed on Sep. 7, 2016, now Pat. No. 10,053,095.

(30) Foreign Application Priority Data

Sep. 9, 2015 (JP) .................................. 2015-177900

(51) Int. Cl.
*B60W 30/16* (2020.01)
*G05D 1/02* (2020.01)
(Continued)

(52) U.S. Cl.
CPC ......... *B60W 30/162* (2013.01); *G05D 1/0246* (2013.01); *G05D 1/0257* (2013.01);
(Continued)

(58) Field of Classification Search
CPC .......... B60W 30/162; B60W 2550/10; B60W 2750/302; B60W 2750/308; G05D 1/0246;
(Continued)

(56) References Cited

U.S. PATENT DOCUMENTS

| 5,881,832 A | 3/1999 | Zitz et al. |
| 5,885,265 A | 3/1999 | Osborn, III |

(Continued)

FOREIGN PATENT DOCUMENTS

| JP | H09-301210 | 11/1997 |
| JP | H10-059598 | 3/1998 |

(Continued)

*Primary Examiner* — Gertrude Arthur Jeanglaude
(74) *Attorney, Agent, or Firm* — Knobbe, Martens, Olson & Bear, LLP

(57) ABSTRACT

In a vehicle control apparatus, a preceding vehicle ahead of an own vehicle is detected. A movement trajectory of a target preceding vehicle is acquired. Based on the movement trajectory of the target preceding vehicle, a target route on which the own vehicle is to travel is set. Travelling control of the own vehicle is performed so as to follow the target preceding vehicle on the target route. An obstacle ahead of the own vehicle is detected. The target route is changed so as to extend a separation distance between the detected obstacle and a parallel portion of the target route that is parallel to the obstacle, based on a separation distance between the obstacle and a parallel portion of the movement trajectory of the target preceding vehicle that is parallel to the obstacle.

17 Claims, 11 Drawing Sheets

(51) Int. Cl.
*G08G 1/16* (2006.01)
*G08G 1/00* (2006.01)

(52) U.S. Cl.
CPC .............. *G08G 1/166* (2013.01); *G08G 1/167* (2013.01); *G08G 1/22* (2013.01); *B60W 2550/10* (2013.01); *B60W 2750/302* (2013.01); *B60W 2750/308* (2013.01); *G05D 2201/0213* (2013.01)

(58) Field of Classification Search
CPC ......... G05D 1/0257; G05D 2201/0213; G08G 1/166; G08G 1/22
USPC .......................................................... 701/26
See application file for complete search history.

(56) References Cited

U.S. PATENT DOCUMENTS

| | | | |
|---|---|---|---|
| 5,955,967 | A | 9/1999 | Yamada |
| 6,292,725 | B1 | 9/2001 | Kageyama |
| 10,053,095 | B2 * | 8/2018 | Habu .................. B60W 30/162 |
| 2009/0216405 | A1 | 8/2009 | Kudo |
| 2016/0224027 | A1 | 8/2016 | Yamamoto et al. |
| 2017/0066444 | A1 | 3/2017 | Habu |

FOREIGN PATENT DOCUMENTS

| | | |
|---|---|---|
| JP | H10-69598 | 3/1998 |
| JP | 2004-078333 | 3/2004 |
| JP | 2005-157754 | 6/2005 |
| JP | 2006-125857 | 5/2006 |
| JP | 2007-084056 | 4/2007 |
| JP | 2007-311604 | 11/2007 |
| JP | 2008-265722 | 11/2008 |
| JP | 2009-202708 | 9/2009 |
| JP | 2010-079689 | 4/2010 |
| JP | 2014-075145 | 4/2014 |
| WO | WO 2015/068193 | 5/2015 |

* cited by examiner

VEHICLE CONTROL APPARATUS

CROSS-REFERENCE TO RELATED APPLICATION

This application is a continuation application of U.S. application Ser. No. 15/258,886, filed on Sep. 7, 2016, and claims the benefit of priority from Japanese Patent Application No. 2015-177900, filed Sep. 9, 2015. The entire disclosures of the above applications are incorporated herein by reference.

TECHNICAL FIELD

The present disclosure relates to a vehicle control apparatus that controls an own vehicle to follow a preceding vehicle.

RELATED ART

Vehicle control that enables an own vehicle to automatically follow a preceding vehicle is performed to improve the driving safety of the vehicle and to reduce operating load placed on a driver. Here, when the obstacle is present in a travelling direction of the own vehicle, the own vehicle can avoid the obstacle by traveling on a movement trajectory of a preceding vehicle that has avoided the obstacle (refer to JP-A-2004-78333).

However, in cases in which the preceding vehicle does not avoid the obstacle with a sufficient margin, the distance between the own vehicle and the obstacle may become short when the own vehicle passes the vicinity of the obstacle. As a result, the driver may experience discomfort.

SUMMARY

It is thus desired to provide a vehicle control apparatus that is capable of reducing discomfort experienced by a driver when an own vehicle avoids an obstacle when the own vehicle is following a preceding vehicle.

An exemplary embodiment of the present disclosure provides a vehicle control apparatus including: a preceding vehicle detecting unit that detects a preceding vehicle ahead of an own vehicle; a movement trajectory acquiring unit that acquires a movement trajectory of a target preceding vehicle; a target route setting unit that sets a target route on which the own vehicle is to travel, based on the movement trajectory of the target preceding vehicle; an own vehicle control unit that performs travelling control of the own vehicle so as to follow the target preceding vehicle on the target route; an obstacle detecting unit that detects an obstacle ahead of the own vehicle; and a target route changing unit that changes the target route so as to extend a separation distance between the obstacle detected by the obstacle detecting unit and a parallel portion of the target route that is parallel to the obstacle, based on a separation distance between the obstacle and a parallel portion of the movement trajectory of the target preceding vehicle that is parallel to the obstacle.

According to the present exemplary embodiment, the target route can be changed so as to extend the separation distance between the obstacle and the parallel portion of the target route that is parallel to the obstacle, based on the separation distance between the obstacle and the parallel portion of the movement trajectory of the target preceding vehicle that is parallel to the obstacle. Therefore, discomfort experienced by the driver when the own vehicle avoids the obstacle can be reduced.

DESCRIPTION OF THE EMBODIMENTS

An embodiment of actualizing a vehicle control apparatus will hereinafter be described with reference to the drawings.

The vehicle control apparatus according to the present embodiment is mounted in a vehicle. The vehicle control apparatus detects a preceding vehicle among other vehicles traveling ahead of the own vehicle. The preceding vehicle is a vehicle traveling in the same traffic lane (own traffic lane) as the own vehicle. The vehicle control apparatus selects a preceding vehicle (target preceding vehicle) to be followed by the own vehicle, among the detected preceding vehicles. The vehicle control apparatus then performs control (following control) to enable the own vehicle to perform following travelling, that is, follow the target preceding vehicle.

Following control includes first control and second control. In the first control, the vehicle control apparatus controls the vehicle speed of the own vehicle such that an inter-vehicle distance between the own vehicle and the target preceding vehicle becomes a target inter-vehicle distance. In the second control, the vehicle control apparatus controls a steering amount of the own vehicle to match a horizontal direction position in relation to a travelling direction of the target preceding vehicle with a horizontal direction position in relation to a travelling direction of the own vehicle.

First, an overall configuration of the vehicle control apparatus according to the present embodiment will be described with reference to FIG. 1.

Figure 1:
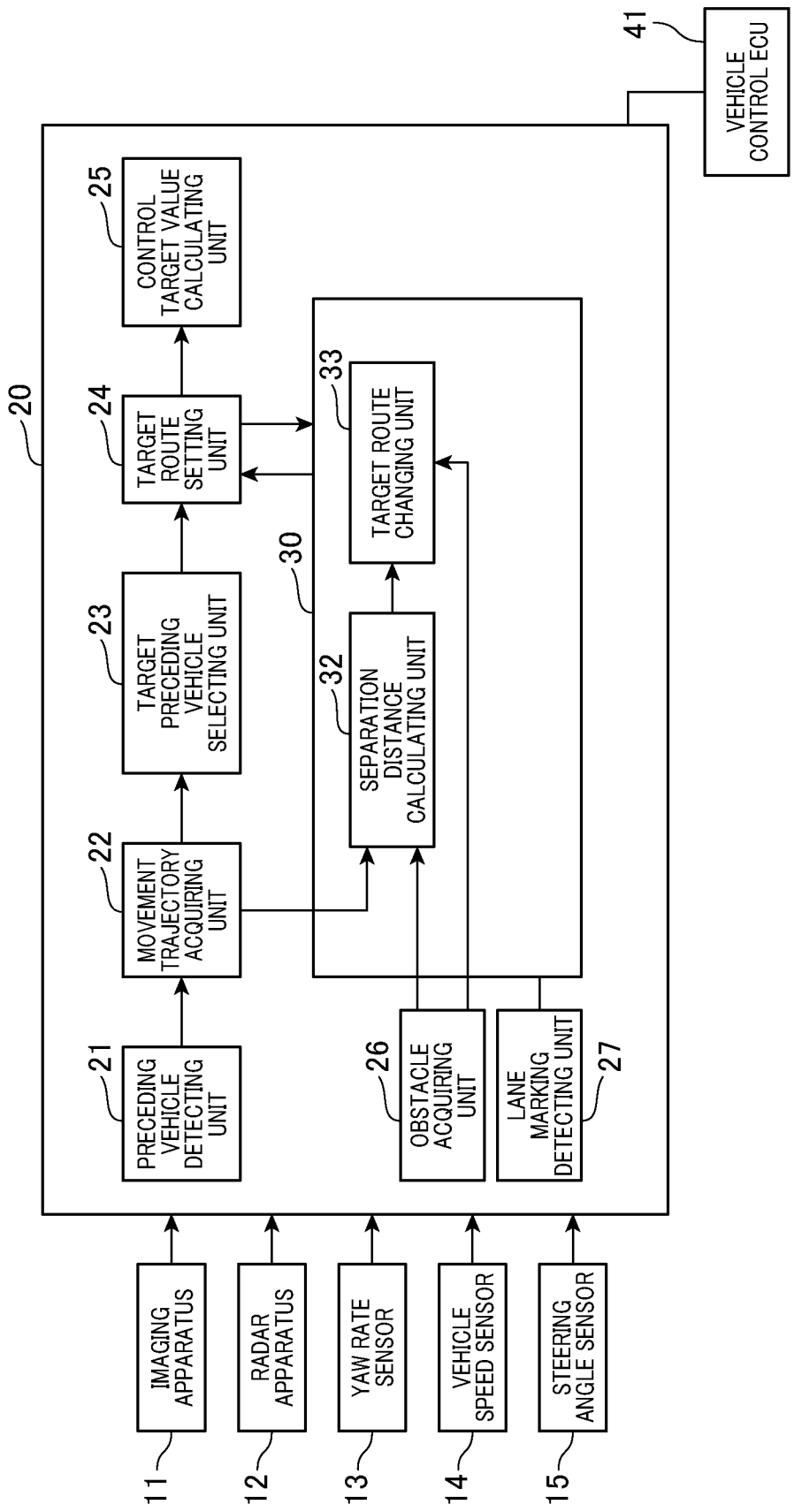
FIG. 1 is an overall configuration diagram of a vehicle control apparatus.

In FIG. 1, a vehicle control apparatus 20 is provided with an imaging apparatus 11 and a radar apparatus 12 that detect an object present in the periphery of the own vehicle.

The imaging apparatus 11 is an on-board camera that is configured by a charge-coupled device (CCD) camera, a complementary metal-oxide-semiconductor (CMOS) image sensor, a near-infrared camera, or the like. The imaging apparatus 11 captures an image of the surrounding environment of the own vehicle, including the road on which the own vehicle is traveling. The imaging apparatus 11 generates image data expressing the captured image and successively outputs the image data to the vehicle control apparatus 20. For example, the imaging apparatus 11 is set near an upper side of the front windshield of the own vehicle. The imaging apparatus 11 captures an image of an area that spreads over a predetermined angle range towards the area ahead of the own vehicle, with an imaging axis as the center. The imaging apparatus 11 may be a single-lens camera or a stereo camera.

The radar apparatus 12 is a detection apparatus that detects an object by transmitting electromagnetic waves as transmission waves and receiving reflected waves thereof. The radar apparatus 12 is configured by a millimeter-wave radar or the like. For example, the radar apparatus 12 is attached to a front portion of the own vehicle. The radar apparatus 12 uses radar signals to scan an area that extends over a predetermined angle range towards the area ahead of the own vehicle. The radar apparatus 12 generates reception data based on the amount of time from when the electromagnetic waves are transmitted towards the area ahead of the own vehicle until the reflected waves are received. The reception data includes distance measurement data and reflection intensity data. The distance measurement data includes information related to orientation at which an object is present, distance to the object, and relative speed. The reflection intensity data includes information related to reception intensity of the reflected waves received from an object. Information on the reception data generated by the radar apparatus 12 is successively outputted to the vehicle control apparatus 20.

In addition, as various sensors, the vehicle control apparatus 12 is provided with a yaw rate sensor 13, a vehicle speed sensor 14, a steering angle sensor 15, and the like. The yaw rate sensor 13 detects an angular velocity (yaw rate) in a turning direction of a vehicle. The vehicle speed sensor 14 detects a vehicle speed. The steering angle detects a steering angle.

The vehicle control apparatus 20 is a computer that includes a central processing unit (CPU), a read-only memory (ROM), a random access memory (RAM), an input/output (I/O), and the like. The vehicle control apparatus 20 includes a preceding vehicle detecting unit 21, a movement trajectory acquiring unit 22, a target preceding vehicle selecting unit 23, a target route setting unit 24, a control target value calculating unit 25, an obstacle acquiring unit 26, a lane marking acquiring unit 27, and a target route calculating unit 30. The vehicle control apparatus 20 actualizes various functions by the CPU running a program installed in the ROM, based on the image data from the imaging apparatus 11, the distance measurement data from the radar apparatus 12, and detection signals from the various sensors provided in the own vehicle.

The preceding vehicle detecting unit 21 detects a vehicle traveling in the same traffic lane as the own vehicle as a preceding vehicle, based on information on an object acquired by the imaging apparatus 11 and the radar apparatus 12. For example, the preceding vehicle detecting unit 21 detects the preceding vehicle by combining the information on an object extracted from the image data from the imaging apparatus 11 and the information on an object extracted from the distance measurement data from the radar apparatus 12. Alternatively, the preceding vehicle detecting unit 21 may detect the preceding vehicle using either of the information on an object extracted from the image data from the imaging apparatus 11 and the information on an object extracted from the distance measurement data from the radar apparatus 12. The information on the preceding vehicle detected by the preceding vehicle detecting unit 21 is outputted to the movement trajectory acquiring unit 22.

The movement trajectory acquiring unit 22 calculates a preceding vehicle position at a predetermined cycle, based on the distance measurement data (information on the distance to the preceding vehicle and lateral position information) among data received from the radar apparatus 12. The preceding vehicle position is the position (coordinates) of the preceding vehicle. The movement trajectory acquiring unit 22 stores the calculated preceding vehicle positions in time series. The movement trajectory acquiring unit 22 then calculates a movement trajectory of the preceding vehicle based on the stored time-series data on the preceding vehicle position. Information on the calculated movement trajectory of the preceding vehicle is outputted to the target preceding vehicle selecting unit 23. When information on a plurality of preceding vehicles is inputted from the preceding vehicle detecting unit 21, the movement trajectory acquiring unit 22 individually calculates the movement trajectory of each preceding vehicle. The information on the movement trajectory of the preceding vehicle acquired by the movement trajectory acquiring unit 22 is outputted to the target preceding vehicle selecting unit 23 and a separation distance calculating unit 32.

The target preceding vehicle selecting unit 23 selects a preceding vehicle to be followed by the own vehicle, among the preceding vehicles detected by the preceding vehicle detecting unit 21, as a target preceding vehicle. For example, the target preceding vehicle selecting unit 23 selects a preceding vehicle in a position at which an inter-vehicle distance to the own vehicle in the own traffic lane is the shortest. Information on the target preceding vehicle selected by the target preceding vehicle selecting unit 23 is outputted to the target route setting unit 24 and the target route calculating unit 30.

The target route setting unit 24 sets a future traveling course of the own vehicle as a target route, based on the movement trajectory of the target preceding vehicle.

The control target value calculating unit 25 calculates a control target value for enabling the own vehicle to travel on the target route. Specifically, in the first control in which the inter-vehicle distance between the target preceding vehicle and the own vehicle is kept at a target spacing set in advance, the control target value calculating unit 25 calculates a control target value related to the traveling speed of the own vehicle. In addition, in the second control in which the horizontal direction position in relation to the travelling direction of the target preceding vehicle is matched with the horizontal direction position in relation to the travelling direction of the own vehicle, the control target value calculating unit 25 calculates a control target value related to the steering amount of the own vehicle.

These control target values are outputted to a vehicle control electronic control unit (ECU) 41. The vehicle control ECU 41 adjusts an engine brake of the own vehicle or steering of the own vehicle such that the traveling speed or the steering amount of the own vehicle is set to the control target value.

The obstacle acquiring unit 26 detects an obstacle ahead of the own vehicle using the image data acquired from the imaging apparatus 11 and reception data acquired from the radar apparatus 12. For example, the obstacle includes another vehicle parked in the own traffic lane and another vehicle that is traveling (moving) at a low speed in the own traffic lane. The other vehicle includes motorcycles in addition to automobiles. In addition to other vehicles, the obstacle includes various objects provided in a construction zone in the own traffic lane, various objects lying in the own traffic lane, and the like. The obstacle detected by the obstacle acquiring unit 26 may be outside of the own traffic lane. For example, a stationary object, such as a guardrail, provided along the roadside outside of the own traffic lane can also be detected as the obstacle.

The obstacle acquiring unit 26 outputs information related to the detected obstacle to the separation distance calculating unit 32. The information related to an obstacle includes information related to the size of the obstacle (such as a lateral position or a lateral width of the obstacle) and information related to the material of the obstacle (such as the reflection intensity). The information related to the size of the obstacle can mainly be acquired from the image data from the imaging apparatus 11. The information related to the material of the obstacle can mainly be acquired from the reception data from the radar apparatus 12.

The lane marking acquiring unit 27 acquires information related to road lane markings from the image data from the imaging apparatus 11. For example, the lane marking acquiring unit 27 extracts edge points that serve as candidates for a lane marking from the image data, based on a rate of change in luminance in a horizontal direction of the image. The lane marking acquiring unit 27 successively stores the extracted edge points for each frame and calculates lane marking information based on the history of the stored edge points of the lane marking. As a result, the lane marking acquiring unit 27 acquires, as the road lane marking, white lines provided on the left and right sides of the own traffic lane, a marking between the own traffic lane and a branch road (branch lane marking), a marking between the own traffic lane and an opposing traffic lane, and the like. The lane marking information acquired by the lane marking acquiring unit 27 is outputted to the target route calculating unit 30.

Figure 2:
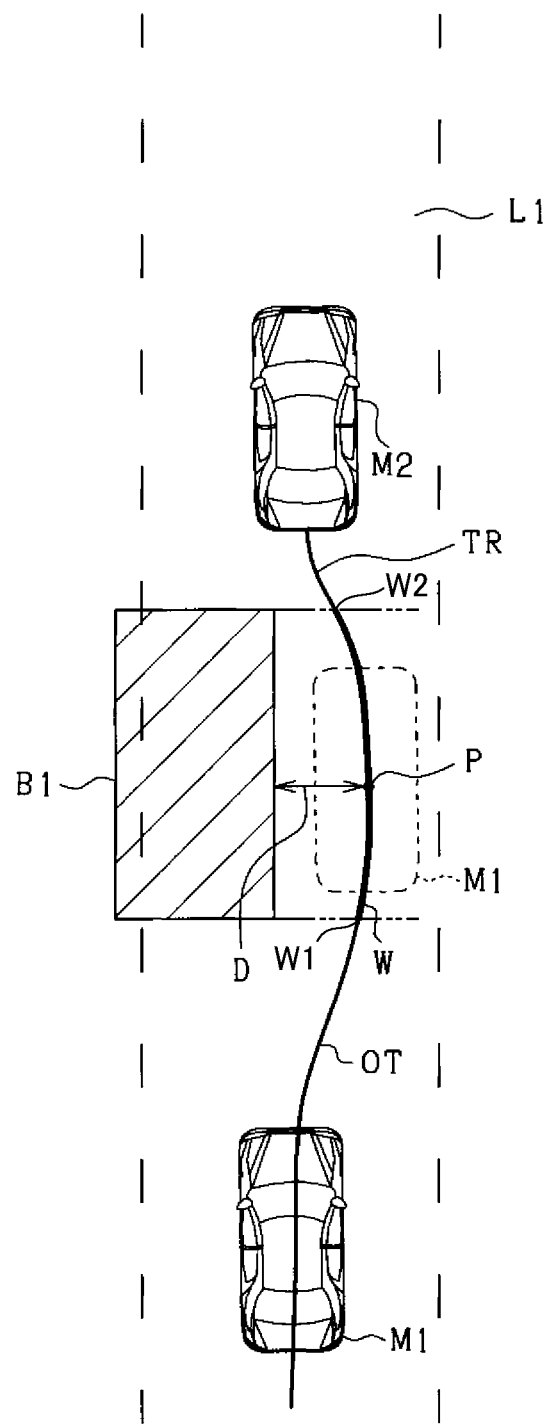
FIG. 2 is a planar view of a traveling state of an own vehicle based on a separation distance between an obstacle and a preceding vehicle trajectory.

As shown in an example in FIG. 2, when an obstacle B1 is present on an own traffic lane L1, a target preceding vehicle M2 travels so as to avoid the obstacle B1. However, depending on the manner in which the target preceding vehicle M2 avoids the obstacle B1, the target preceding vehicle M2 and the obstacle B1 may become close to each other when the target preceding vehicle M2 passes near the obstacle B1.

Consequently, when travelling control of an own vehicle M1 is performed such that the own vehicle M1 travels on a target route OT that is set based on a movement trajectory TR of the target preceding vehicle M2 (in the example of FIG. 2, the target route OT is set on the movement trajectory TR), a sufficient distance between the own vehicle M1 and the obstacle B1 may not be ensured when the own vehicle M1 passes by the side of the obstacle B1. The driver may experience discomfort.

Therefore, according to the present embodiment, when the obstacle acquiring unit 26 detects the obstacle B1 ahead of the own vehicle M1, the target route calculating unit 30 determines a separation distance D between the obstacle B1 and a parallel portion W of the movement trajectory TR of the target preceding vehicle M2. The parallel portion W is a portion of the movement trajectory TR that is parallel to the obstacle B1 and ranges from a point W1 to a point W2 as shown in FIG. 2. When the separation distance D is less (shorter) than a predetermined threshold Th, the target route calculating unit 30 changes the target route OT so as to extend the separation distance D of the parallel portion W, and newly sets a post-change target route OT1. For example, the threshold Th can be set based on a distance that is determined in advance as a distance allowing the driver of own vehicle to feel capable of avoiding an obstacle with a sufficient margin (see FIG. 3).

Here, a process by which the target route calculating unit 30 sets the post-change target route OT1 will be described in detail. The target route calculating unit 30 includes the separation distance calculating unit 32 and a target route changing unit 33 (see FIG. 1).

Figure 3:
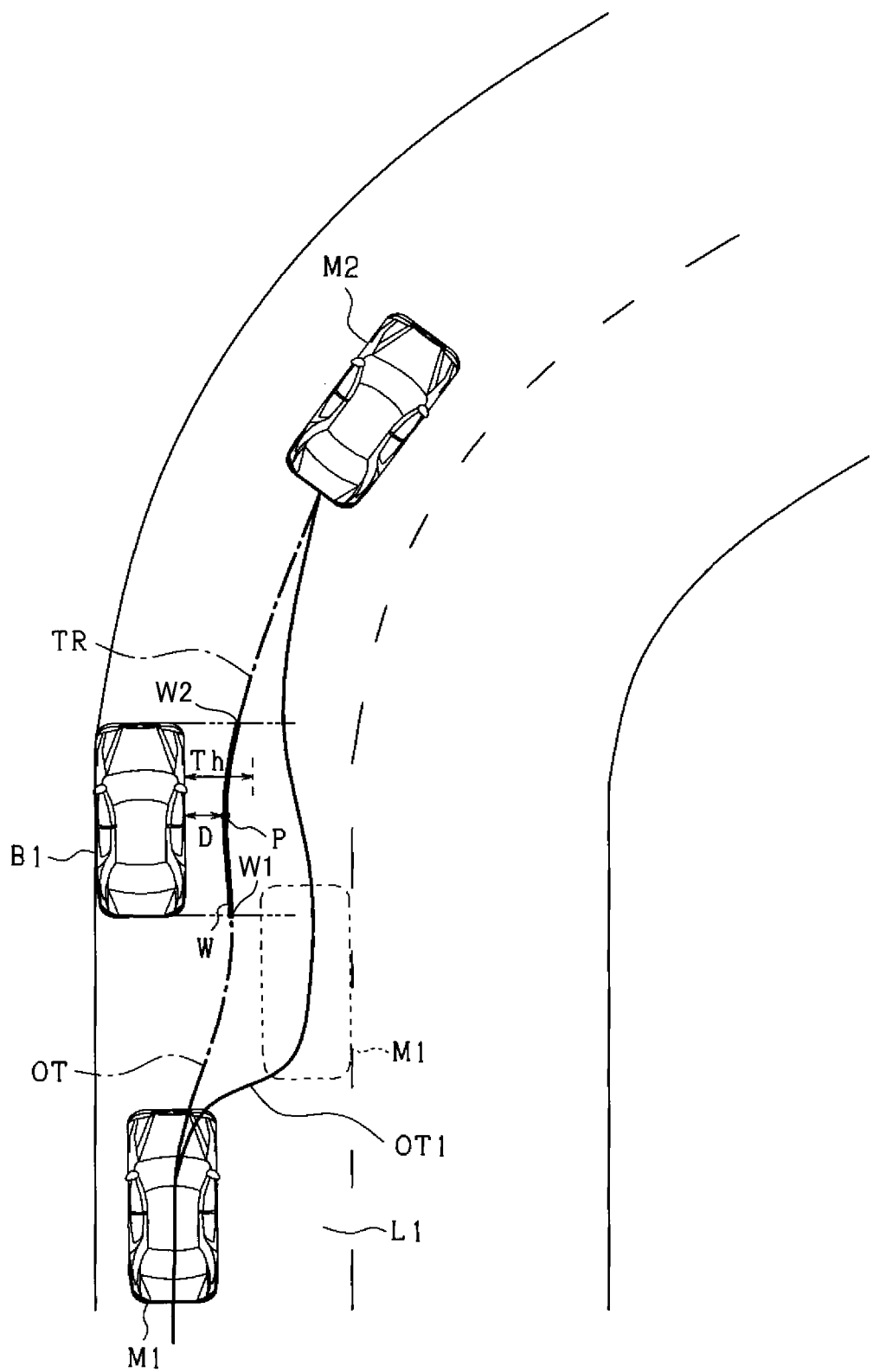
FIG. 3 is a planar view of a case in which a target route is changed to avoid a stopped vehicle on an own traffic lane.

The separation distance calculating unit 32 determines the separation distance D between the obstacle B1 and the parallel portion W of the movement trajectory TR of the target preceding vehicle M2. The parallel portion W is a portion of the movement trajectory TR that is parallel to the obstacle B1. For example, as shown in FIG. 3, the separation distance calculating unit 32 sets a position P on the movement trajectory TR at a position ahead of the own vehicle by a predetermined distance. The separation distance calculating unit 32 then determines, as the separation distance D, a distance from the position P on the movement trajectory TR to a point at which the obstacle B and a perpendicular line, which is drawn so as to extend from the position P in a direction perpendicular to the movement trajectory TR at the point P, intersect. The value of the separation distance C acquired by the separation distance calculating unit 32 is outputted to the target route changing unit 33.

The position P may be set at a predetermined position within the area of the parallel portion W. For example, the position P may be set in a location in the parallel portion W where the separation distance D is the smallest value. In this case, the target route OT can be changed with reference to the location at which the obstacle B1 and the own vehicle M1 are likely to become the closest to each other. The effect of ensuring an appropriate separation distance D between the own vehicle M1 and the obstacle B1 can be improved.

The target route changing unit 33 does not change the target route OT when the separation distance D determined by the separation distance calculating unit 32 is greater than the threshold Th. Meanwhile, the target route changing unit 33 changes the target route OT set by the target route setting unit 24 when the separation distance D determined by the separation distance calculating unit 32 is less than the threshold Th. Specifically, the target route changing unit 33 newly sets the post-change target route OT so as to extend the separation distance D between the obstacle B1 and the parallel portion W of the target route OT (set on the movement trajectory TR) that is parallel to the obstacle B1 and ranges from a point W1 to a point W2, that is, to increase the separation distance D (see FIG. 3).

For example, according to the present embodiment, the target route changing unit 33 sets the post-change target route OT1 in a position offset from the target route OT by a certain amount in the direction away from the obstacle B1. In addition, the target route changing unit 33 may set the post-change target route OT1 in a position at which the separation distance D becomes greater than the threshold Th. Furthermore, the position in which the post-change target route OT1 is set may be variably set depending on the magnitude of the separation distance D. In this case, the target route changing unit 33 may set the post-change target route OT1 such that the offset amount from the obstacle B1 increases as the separation distance D becomes shorter.

In addition, when setting the post-change target route OT1, the target route changing unit 33 according to the present embodiment sets the post-change target route OT1 such that the separation distance D gradually changes (increases) before and after the obstacle B1 and the parallel portion W of the target route OT that is parallel to the obstacle B1. As a result, the occurrence of lateral acceleration accompanying the steering of the own vehicle that accompanies the change in the target route can be suppressed. The target route changing unit 33 may also set the post-change target route OT1 such that the separation distance D at the parallel portion W rapidly increases.

Furthermore, the target route changing unit 33 according to the present embodiment sets the offset amount of the post-change target route OT1 with reference to the position of the target route OT set by the target route setting unit 24. In addition, the target route changing unit 33 may set the offset amount of the post-change target route OT1 with reference to the position of the obstacle B1.

When the target route changing unit 33 sets the post-change target route OT1, the control target value calculating unit 25 calculates each control target value based on the post-change target route OT1.

Next, the steps in a process for changing the target route performed by the vehicle control apparatus 20 will be described with reference to the flowchart in FIG. 4.

First, the vehicle control apparatus 20 detects the information on an object (step S11). In the present process, the vehicle control apparatus 20 detects another vehicle traveling ahead of the own vehicle M1 (such as a preceding vehicle or an oncoming vehicle), an obstacle B1 ahead of the own vehicle M1, and the like, using the image data from the imaging apparatus 11 and the reception data from the radar apparatus 12. The vehicle control apparatus 20 then selects the target preceding vehicle M2 (step S12). As the target preceding vehicle M2, the vehicle control apparatus 20 selects a preceding vehicle to be followed by the own vehicle M1, among the preceding vehicles traveling in the same traffic lane as the own vehicle M1 that have been detected at step S11. The vehicle control apparatus 20 then acquires the movement trajectory TR of the selected target preceding vehicle M2 (step S13).

Next, the vehicle control apparatus 20 determines whether or not an obstacle B1 is present ahead of the own vehicle M1 (step S14). In the present process, the vehicle control apparatus 20 makes an affirmative determination when an obstacle B1 is detected at S11. When determined that an obstacle B1 is present at step S14, the vehicle control apparatus 20 determines whether or not the separation distance D between the obstacle B1 and the movement trajectory TR of the target preceding vehicle M2 can be acquired (step S15). In the present process, the vehicle control apparatus 20 makes an affirmative determination when the target preceding vehicle M2 has already passed the position of the obstacle B1. The vehicle control apparatus 20 can determine whether or not the target preceding vehicle M2 has already passed the position of the obstacle B1 by comparing the position of the obstacle B1 and the current position of the target preceding vehicle M2. When determined that the separation distance D can be acquired, the vehicle control apparatus 20 determines the separation distance D between the obstacle B1 and the parallel portion W of the movement trajectory TR of the target preceding vehicle M2 that is parallel to the obstacle B1 (step S16).

Then, the vehicle control apparatus 20 determines whether or not the separation distance D determined at step S16 is less than the threshold Th (step S17). When determined that the separation distance D is less than the threshold Th, the vehicle control apparatus 20 determines that the target route OT is to be changed (step S18). When determined that the target route OT is to be changed, the vehicle control apparatus 20 sets the post-change target route OT. When determined that the separation distance D is greater than the threshold Th at step S16, the vehicle control apparatus 20 determines that the target route OT is not to be changed (S19).

Meanwhile, when determined that an obstacle B1 is not present at step S14, the vehicle control apparatus 20 determines whether or not the target route OT has been changed (step S20). In the present process, the vehicle control apparatus 20 makes an affirmative determination when the post-change target route OT1 is set. When determined that the target route OT has been changed, the vehicle control apparatus 20 cancels the setting of the post-change target route OT1 (step S21). When the change to the post-change target route OT1 is canceled at S21, the vehicle control apparatus 20 sets the target route OT based on the movement trajectory TR of the target preceding vehicle M2.

Execution examples of the above-described processes will be described below.

(1) In FIG. 3, a stopped vehicle is present up ahead in the own traffic lane L1, as the obstacle B1. In this case, when the separation distance D between the obstacle B1 and the parallel portion W of the movement trajectory TR of the target preceding vehicle M2 that is parallel to the obstacle B1 is determined to be less than the threshold Th, the target route OT is changed to the post-change target route OT. The own vehicle M1 is then controlled to travel on the target route OT1. As a result, the own vehicle M1 is controlled to travel in a state in which the predetermined separation distance D to the obstacle B1 is ensured.

Subsequently, when the own vehicle M1 passes the side of the obstacle B1, the stopped vehicle is no longer detected. Therefore, the setting of the post-change target route OT ends. Thereafter, the own vehicle M1 is controlled to travel on the target route OT set based on the movement trajectory TR of the target preceding vehicle.

In the case in which the post-change target route OT1 is changed to the target route OT set based on the movement trajectory TR of the target preceding vehicle M2 as well, it is preferable that the occurrence of lateral acceleration accompanying the steering of the own vehicle resulting from the change in the target route be suppressed by the target routes being switched such that the separation distance D before and after the parallel portion W gradually changes.

Figure 5:
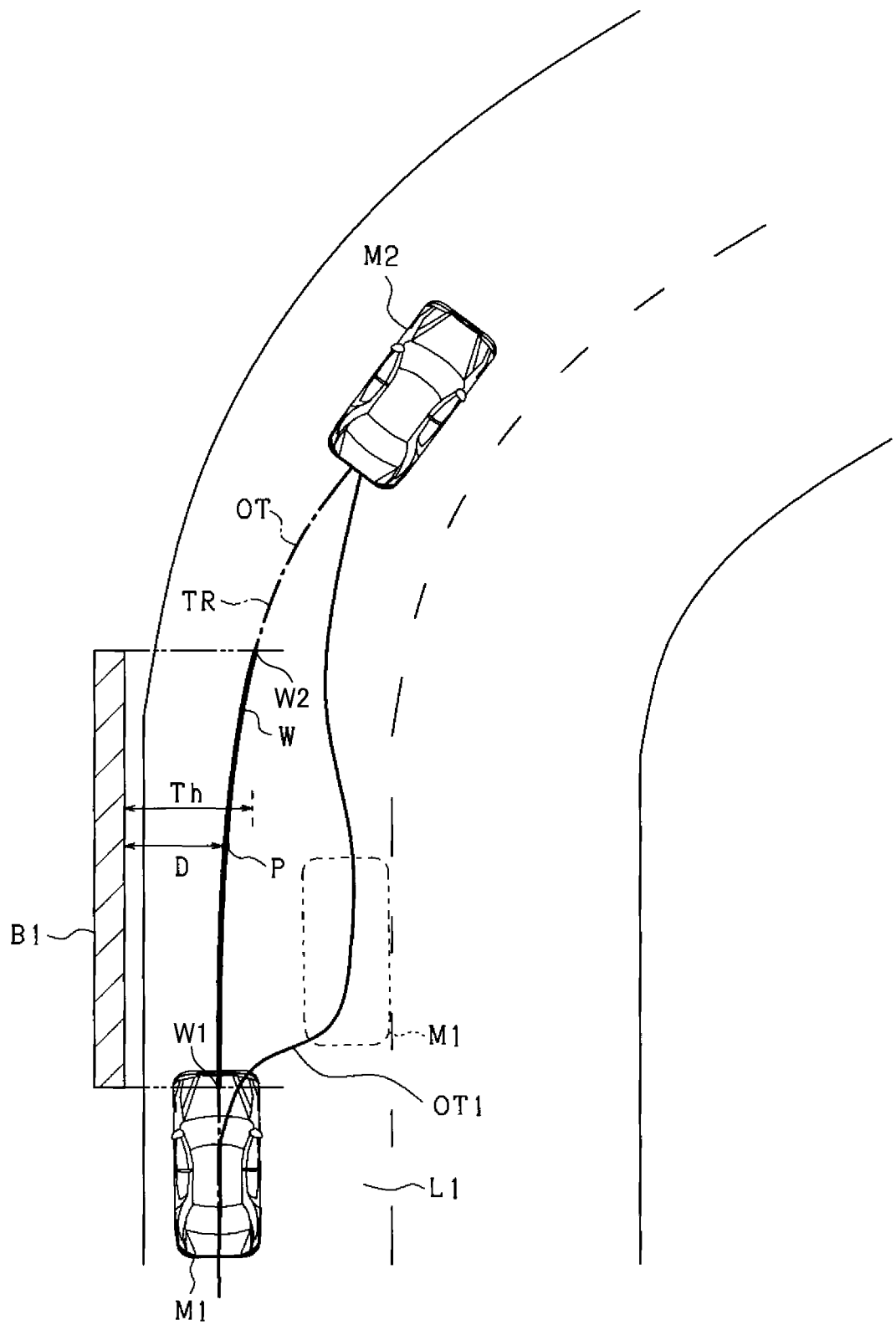
FIG. 5 is a planar view of a case in which the target route is changed to avoid an obstacle outside of an own traffic lane.

(2) In FIG. 5, a stationary object (such as a guardrail) is present outside of the own traffic lane L1, as the obstacle B1. The driver may experience discomfort when the own vehicle M1 becomes close to even an obstacle B1 outside of the own traffic lane L1 such as this. Therefore, in this case as well, when the separation distance D between the obstacle B1 and the parallel portion W of the movement trajectory TR of the target preceding vehicle M2, which is parallel to the obstacle B1 and ranges from a point W1 to a point W2, is determined to be less than the threshold Th, the target route OT is changed to the post-change target route OT. The own vehicle M1 is then controlled to travel on the target route OT1. As a result, the own vehicle M1 can travel in a state in which a predetermined distance to the stationary object is ensured.

Subsequently, when the own vehicle M1 passes the side of the obstacle B1, the stationary object that is the obstacle B1 is no longer detected. Therefore, the changing of the target route ends. Travelling control of the own vehicle M1 is changed to that based on the target route OT set based on the movement trajectory TR of the target preceding vehicle.

As a result of the foregoing, the following advantageous effects can be achieved.

The target route OT is changed so as to extend the separation distance D between the obstacle B1 and the parallel portion W of the target route OT that is parallel to the obstacle B1, based on the separation distance D at the parallel portion W between the obstacle B1 and the movement trajectory TR of the target preceding vehicle M2. As a result, discomfort experienced by the driver when the own vehicle M1 avoids the obstacle B1 can be reduced.

When the separation distance D between the obstacle B1 and the parallel portion W of the movement trajectory TR of the target preceding vehicle M2 that is parallel to the obstacle B1 is less than the threshold Th, the target route OT is changed to the target route OT to extend the separation distance D at the parallel portion W between the obstacle B1 and the parallel portion W of the target route OT that is parallel to the obstacle B1. Therefore, even in a situation in which the separation distance D between the obstacle B1 and the parallel portion W of the movement trajectory TR that is parallel to the obstacle B1 becomes short, the own vehicle M1 can be made to pass through a position away from the obstacle B1.

The own vehicle M1 can be made to travel so as to avoid the obstacle B1, the obstacle B1 being within the own traffic lane L1 or at a location adjacent to the own traffic lane L1.

The target route OT set by the target route setting unit 24 is gradually changed. Therefore, the occurrence of lateral acceleration accompanying steering of the own vehicle M1 can be suppressed. Furthermore, the effect of reducing discomfort experienced by the driver can be improved.

The changing of the target route is stopped after detection of the obstacle B1 is stopped. Therefore, the own vehicle M1 can subsequently be controlled to travel on the target route OT set based on the movement trajectory TR of the target preceding vehicle M2.

The above-described embodiment may also be modified in the following manner. Configurations in the description below that are similar to those described above are given the same reference numbers. Detailed descriptions thereof are omitted.

Figure 4:
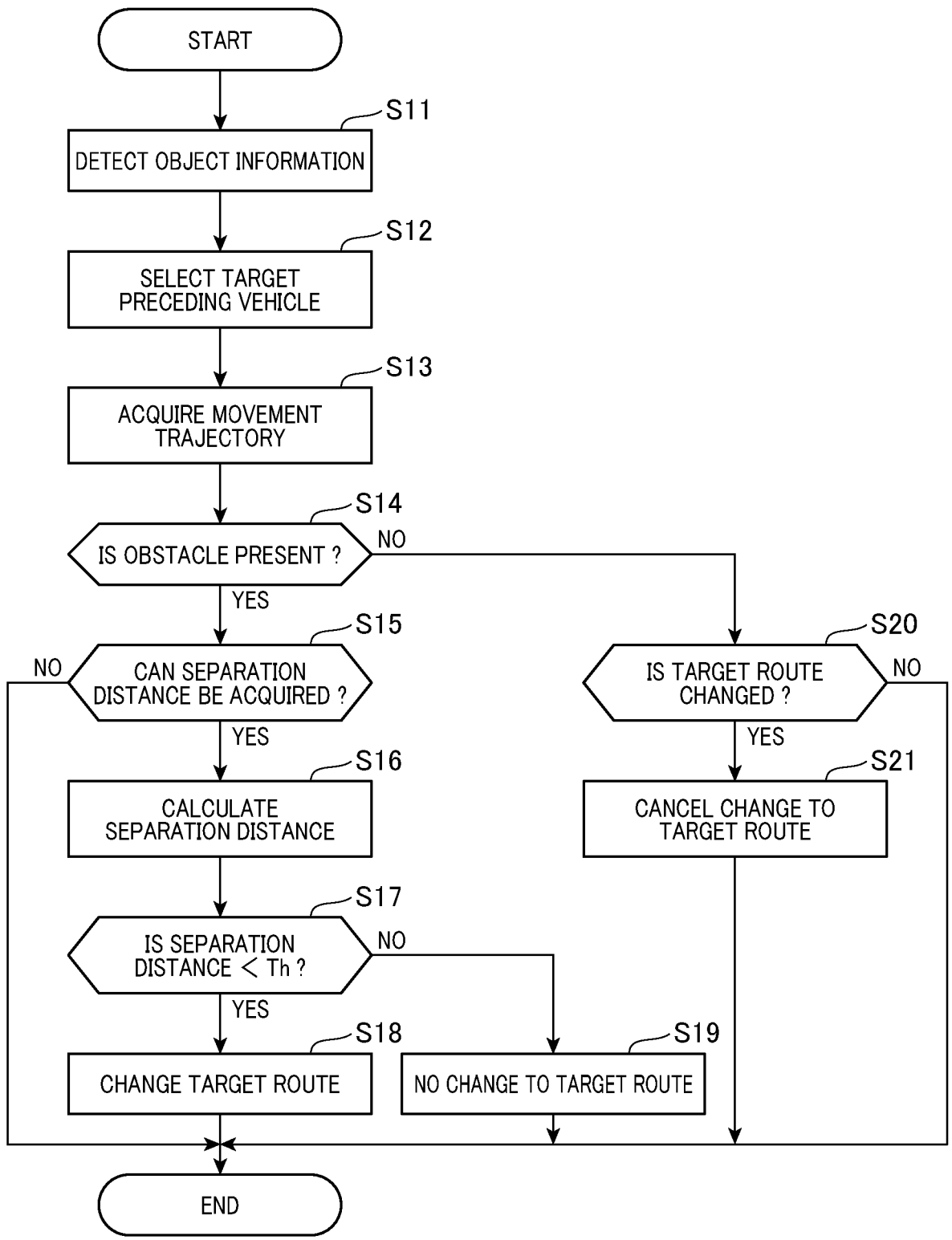
FIG. 4 is a flowchart related to a process for changing the target route.

In the above-described flowchart in FIG. 4, when determined that the separation distance D is less than the threshold Th at step S17, the vehicle control apparatus 20 may stop travelling control of the own vehicle M1, instead of performing the process at step S18. As a result of travelling control of the own vehicle M1 being stopped when the separation distance D is less than the predetermined threshold Th in this way, discomfort experienced by the driver in accompaniment with the separation distance D between the obstacle B1 and the target route OT being short can be suppressed. In this case, the driver is preferably notified that travelling control of the own vehicle M1 is stopped.

When the vehicle speed of the own vehicle M1 (own vehicle speed, that is, the vehicle speed of the target preceding vehicle M2) is high, the own vehicle M1 quickly approaches the obstacle B1. Meanwhile, when the own vehicle speed is low, time is required for the own vehicle M1 to move close to the obstacle B1. Here, an acquisition position of the separation distance D at the parallel portion W that is parallel to the obstacle B1 may be set based on the own vehicle speed.

Figure 6:
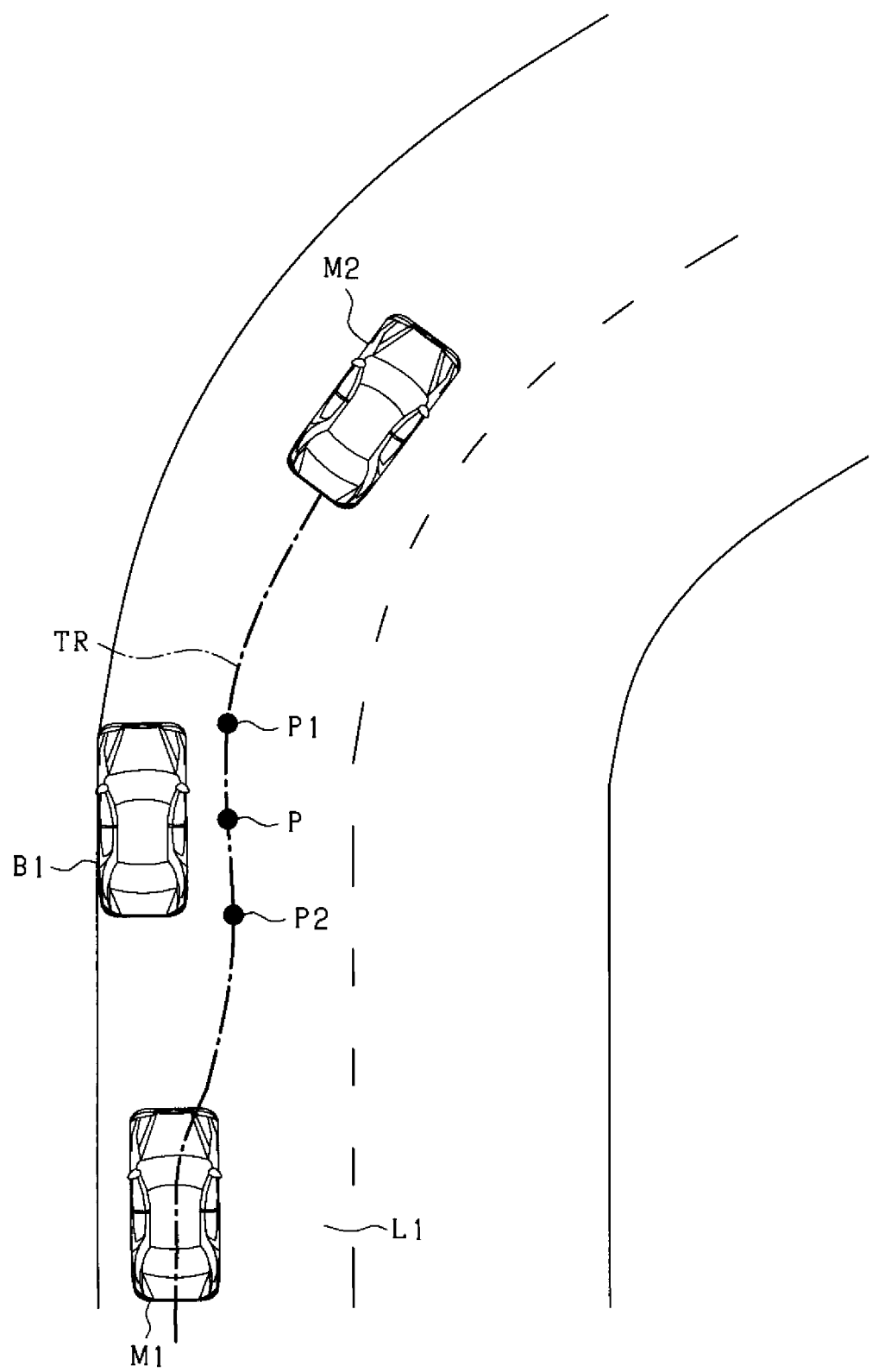
FIG. 6 is a planar view related to change in an acquisition position of the separation distance based on an own vehicle speed.
Figure 7:
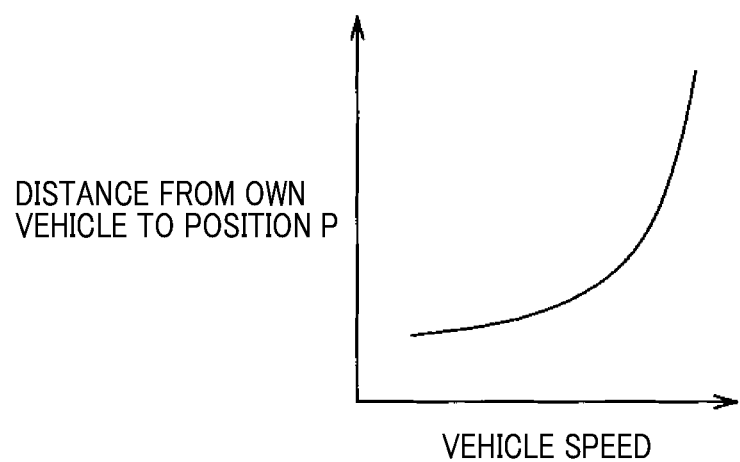
FIG. 7 is a planar view related to setting of the acquisition position of the separation distance based on the own vehicle speed.

For example, as shown in FIG. 6, the separation distance D is acquired at a position P at an own vehicle speed of V. When the own vehicle speed is V1 (>V), the separation distance D is acquired at a position P1 that is farther than the position P. When the own vehicle speed is V2 (<V), the separation distance D is acquired at a position P2 that is closer than the position P. That is, as shown in FIG. 7, the acquisition position, that is, the position P is determined such that the distance between the own vehicle M1 and the position P increases as the own vehicle speed increases.

As a result, the separation distance D at the parallel portion W between the movement trajectory TR of the target preceding vehicle M2 and the obstacle B1 can be more appropriately acquired, taking into consideration the closeness of the own vehicle M1 to the obstacle B1.

In the description above, the driver tends to experience more discomfort when the own vehicle M1 avoids the obstacle B1, as the own vehicle speed increases. The driver tends to experience less discomfort as the own vehicle speed decreases. Therefore, the post-change target route OT1 may be set (variably set) based on the own vehicle speed.

For example, in the flowchart in FIG. 4, when determined that the target route OT is to be changed at step S18, the vehicle control apparatus 20 acquires the own speed of the own vehicle M1. Then, the vehicle control apparatus 20 adjusts the offset amount from the target route OT based on the own vehicle speed. Specifically, the vehicle control apparatus 20 increases the offset amount from the target route OT as the own vehicle speed increases.

As a result of the target route OT being changed based on the own vehicle speed as described above, the effect of reducing discomfort experienced by the driver when the own vehicle M1 avoids the obstacle B1 can be improved.

Figure 8:
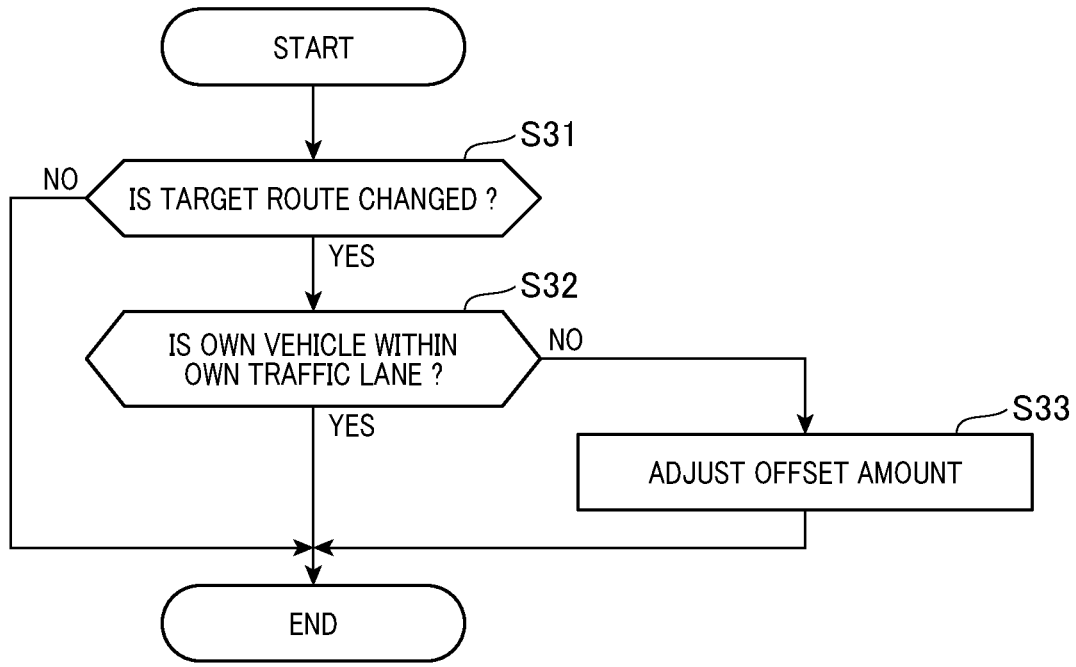
FIG. 8 is a flowchart for adjusting an offset amount when the own vehicle deviates from the own traffic lane.

It can also be assumed that, when the target route OT is changed, the own vehicle M1 will deviate from the own traffic lane L1. Here, when the own vehicle M1 deviates from the own traffic lane L1, the offset amount from the target route OT may be adjusted such that the amount by which the own vehicle M1 deviates from the own traffic lane L1 is reduced. For example, in the flowchart in FIG. 8, the vehicle control apparatus 20 determines whether or not to the target route OT has been changed (step S31).

In the present process, the vehicle control apparatus 20 makes an affirmative determination when the post-change target route OT1 is set. When determined affirmative at step S31, the vehicle control apparatus 20 determines whether the own vehicle M1 will not deviate from the own traffic lane L1, that is, the own vehicle M1 will remain within the own traffic lane L1 when the own vehicle M1 travels on the post-change target route OT1 (step S32).

In the present process, for example, the vehicle control apparatus 20 makes an affirmative determination when the post-change target route OT1 does not deviate from the lane markings on the left and right sides of the own traffic lane L1, acquired by the lane marking acquiring unit 27. The vehicle control apparatus 20 makes a negative determination when the post-change target route OT1 deviates from either of the lane markings on the left and right sides of the own traffic lane L1.

In addition, the vehicle control apparatus 20 may make an affirmative determination at step S32 when the own vehicle M1 does not deviate from the own traffic lane L1 when the own vehicle M1 travels on the post-change target route OT1, taking into consideration a vehicle width of the own vehicle M1.

When determined that the own vehicle M1 will not deviate from the own traffic lane L1 at step S32, the vehicle control apparatus 20 ends the process. Meanwhile, when determined that the own vehicle M1 will deviate from the own traffic lane L1, the vehicle control apparatus 20 adjusts the offset amount from the target route OT (step S33). For example, the vehicle control apparatus 20 reduces the offset amount such that the post-change target route OT1 stays within the own traffic lane L1. In addition, the vehicle control apparatus 20 may adjust the offset amount from the target route OT such that a portion of the vehicle body of the own vehicle M1 does not run out into another traffic lane when the own vehicle M1 travels on the post-change target route OT1.

As a result, the occurrence of problems accompanying the own vehicle M1 deviating from the own traffic lane L1 when the own vehicle M1 travels on the post-change target route OT1 can be suppressed.

Figure 9:
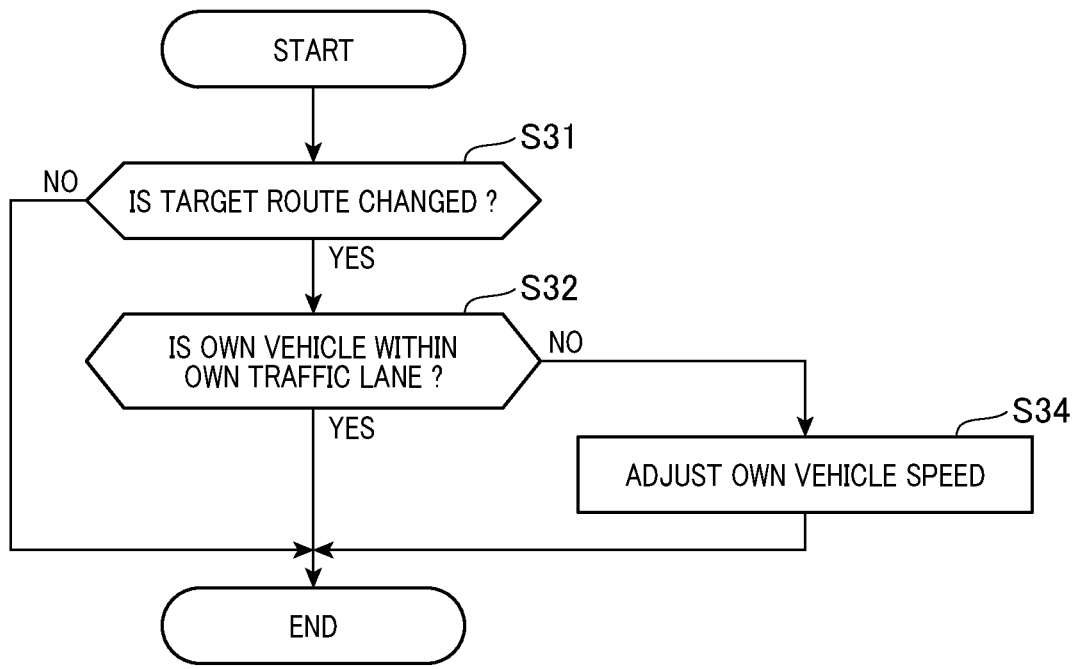
FIG. 9 is a flowchart for adjusting vehicle speed when the own vehicle deviates from the own traffic lane.

When the own vehicle M1 deviates from the own traffic lane L1 as a result of the target route OT being changed, the vehicle speed of the own vehicle M1 may be reduced. For example, in the flowchart in FIG. 9, when determined that the own vehicle M1 will deviate from the own traffic lane L1 in the process at S32, the vehicle control apparatus 20 proceeds to S34 and adjusts the own vehicle speed. Specifically, the vehicle control apparatus 20 adjusts the own vehicle speed to reduce the own vehicle speed as the degree by which the own vehicle M1 will deviate from the own traffic lane L1 increases.

As described above, when the own vehicle M1 deviates from the own traffic lane L1 when the own vehicle M1 travels on the post-change target route OT1, the own vehicle speed is reduced. As a result, discomfort experienced by the driver in accompaniment with the own vehicle M1 deviating outside of the own traffic lane 1 can be reduced.

Figure 10:
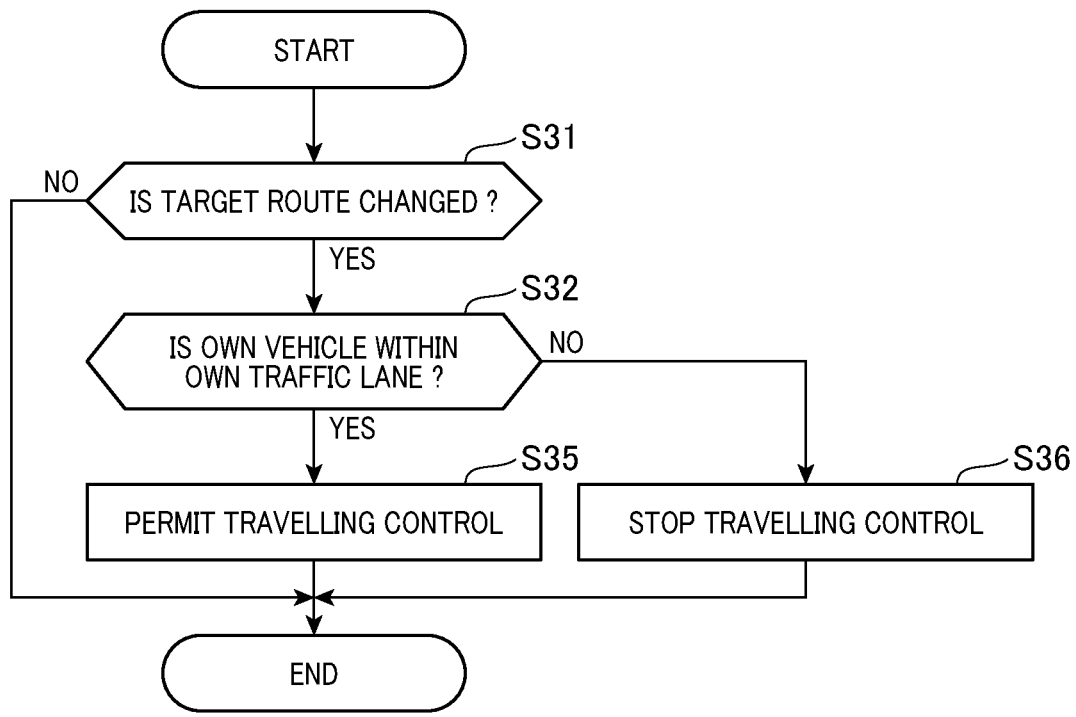
FIG. 10 is a flowchart for stopping travelling control of the own vehicle when the own vehicle deviates from the own traffic lane.

When the own vehicle M1 deviates from the own traffic lane L1 as a result of the target route OT being changed, travelling control of the own vehicle M1 may be stopped. For example, in the flowchart in FIG. 10, when determined that the own vehicle M1 will travel within the own traffic lane L1 when the own vehicle M1 is controlled so as to travel on the post-change target route OT1, the vehicle control apparatus 20 permits travelling control of the own vehicle M1 (step S35). Meanwhile, when determined that the own vehicle M1 will deviate from the own traffic lane L1, the vehicle control apparatus 20 stops travelling control of the own vehicle M1 (step S36). In this case, the driver is preferably notified that travelling control of the own vehicle M1 is stopped.

As described above, travelling control of the own vehicle M1 is stopped under a condition that the own vehicle M1 will deviate from the own traffic lane L1 when the own vehicle M1 travels on the post-change target route OT. As a result, discomfort experienced by the driver in accompaniment with the own vehicle M1 deviating from the own traffic lane L1 can be suppressed.

Figure 11:
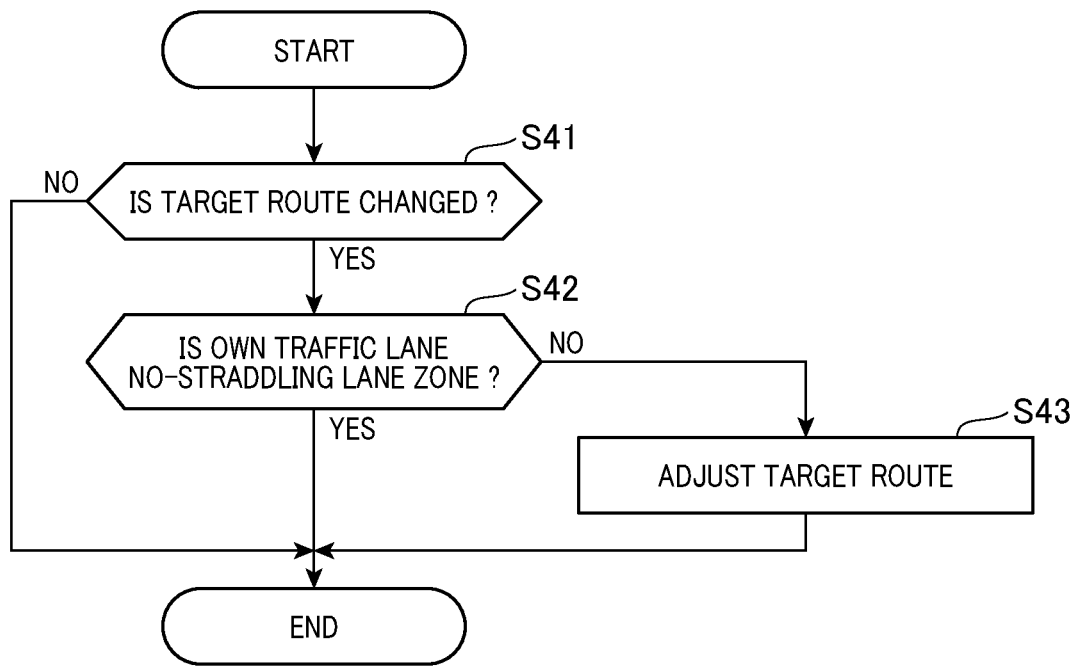
FIG. 11 is a flowchart related to change in the target route when the own traffic lane is a traffic lane zone with no-straddling lane markings in which a vehicle is not permitted to straddle lane markings that define the traffic lane zone.

In the configuration above, when the own traffic lane L1 is a traffic lane zone with no-straddling lane markings (hereinafter referred to as "no-straddling lane zone") in which the vehicle is not permitted to straddle lane markings that define the traffic lane zone, the target route OT may be changed such that the own vehicle M1 does not run outside of the own traffic lane L1. For example, in the flowchart in FIG. 11, the vehicle control apparatus 20 determines whether or not the target route OT has been changed (step S41). When determined that the target route OT has been changed, the vehicle control apparatus 20 determines whether or not the own traffic lane L1 is a no-straddling lane zone (step S42). When the own traffic lane L1 is a no-straddling lane zone, a characteristic is present in that the lane marking that defines the own traffic lane L1 is a solid line.

Here, when detected that the lane marking is a solid line, the vehicle control apparatus 20 makes an affirmative determination that the own traffic lane L1 is a no-straddling lane zone. When determined affirmative, that is, when determined that the own traffic lane L1 is a no-straddling lane zone at S42, the vehicle control apparatus 20 determines the offset amount from the target route OT such that the own vehicle L1 does not run outside of the own traffic lane M1 (step S43). Meanwhile, when determined that the own traffic lane L1 is not a no-straddling lane zone at S42, the vehicle control apparatus 20 ends the process. That is, when the lane marking is not a solid line (e.g., the own lane L1 is a passing lane zone in which the vehicle is permitted to pass another vehicle), the post-change target route OT1 is set regardless of whether or not the own vehicle M1 runs outside of the own traffic lane L1.

As a result, when the own traffic lane L1 is a no-straddling lane zone (e.g., the lane marking that marks the own traffic lane L1 is a solid line), the target route OT can be changed such that the own vehicle M1 does not run outside of the own traffic lane L1. Meanwhile, when the own traffic lane 1 is not a no-straddling lane zone, the post-change target route OT1 can be set such that the separation distance D between the own vehicle M1 and the obstacle B1 is appropriately ensured. When the target route OT is changed such that the own vehicle M1 does not run outside of the own traffic lane L1, the target route OT may be changed such that not even a portion of the own vehicle M1 runs outside of the own traffic lane L1, taking into consideration the lateral width (vehicle width) of the own vehicle M1.

In the configuration above, when the vehicle width of the target preceding vehicle M2 and the vehicle width of the own vehicle M1 differ, the separation distance D required to suppress discomfort experienced by a driver when the target preceding vehicle M2 avoids the obstacle B1 and the separation distance D required to suppress discomfort experienced by the driver when the own vehicle M1 avoids the obstacle B1 may differ. Specifically, when the vehicle width of the own vehicle M1 is greater than the vehicle width of the target preceding vehicle M2, the separation distance D from the obstacle B1 required for the own vehicle M1 to avoid the obstacle B1 is greater than the separation distance D from the obstacle B1 required for the target preceding vehicle M2 to avoid the obstacle B1.

In addition, when the vehicle width of the own vehicle M1 is less than the vehicle width of the target preceding vehicle M2, the separation distance D from the obstacle B1 required for the own vehicle M1 to avoid the obstacle B1 is less than the separation distance D from the obstacle B1 required for the target preceding vehicle M2 to avoid the obstacle B1.

Here, the target route OT may be changed based on the difference between the vehicle width of the target preceding vehicle M2 and the vehicle width of the own vehicle M1. For example, in the flowchart in FIG. 4, when determined that the target route OT is to be changed at S18, the vehicle control apparatus 20 determines whether or not the vehicle width of the target preceding vehicle M2 is greater than the vehicle width of the own vehicle M1. At this time, when determined that the vehicle width of the target preceding vehicle M2 is less than the vehicle width of the own vehicle M1, the vehicle control apparatus 20 sets the offset amount from the target route OT to be larger. Meanwhile, when determined that the vehicle width of the target preceding vehicle M2 is greater than the vehicle width of the own vehicle M1, the vehicle control apparatus 20 sets the offset amount from the target route OT to be smaller.

As described above, the target route OT is changed based on the vehicle widths of the own vehicle M1 and the target preceding vehicle M2. As a result, the effect of suppressing discomfort experienced by the driver can be improved.

In the configuration above, it is assumed that the tendency for the driver to experience discomfort when the own vehicle M1 passes the side of the obstacle B1 changes depending on the size of the obstacle B1 and the material of the obstacle B1. For example, it is assumed that the driver tends to experience more discomfort when the own vehicle M1 passes by the obstacle B1, as the lateral width or vertical width of the obstacle B1 increases. In addition, it is assumed that the driver tends to experience more discomfort when the obstacle 1 is a hard object rather than an object composed of a soft material.

Here, the offset amount from the target route OT may be set based on the size or material of the obstacle B1. For example, the offset amount from the target route OT is set to be larger as the width (lateral width or vertical width) of the obstacle B1 increases, by the vertical axis in the map in FIG. 7 being set to the width of the obstacle B1 and the offset amount from the target route OT being set. In addition, the offset amount from the target route OT is set to be larger as the material of the obstacle B1 becomes harder, by the vertical axis in the map in FIG. 7 being set to a parameter indicating the hardness of the obstacle B1.

As a result of the configuration above, the effect of reducing discomfort (risk) experienced by the driver based on the state of the obstacle B1 can be improved.

Figure 12:
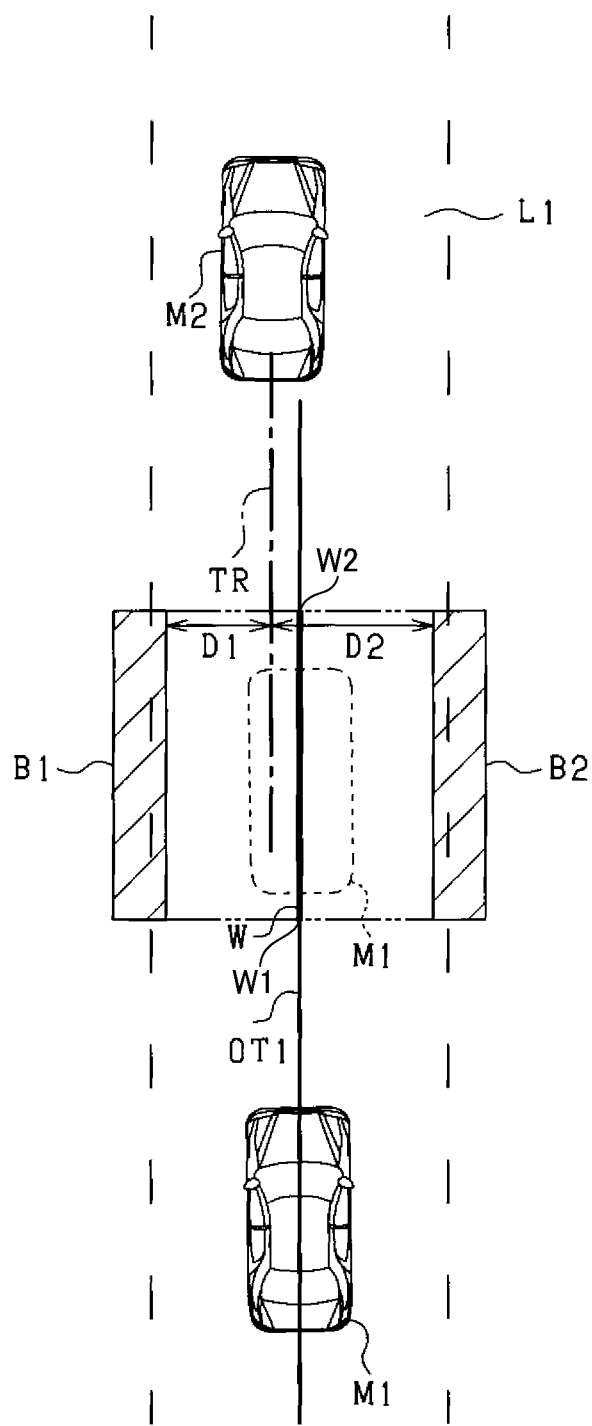
FIG. 12 is a planar view related to change in the target route when obstacles are present on both sides of the own vehicle.

As shown in FIG. 12, it can also be assumed that obstacles B1 and B2 may be detected ahead of the own vehicle M1 in positions on the left and right sides of the own traffic lane L1. In this case, all that is required is that the post-change target route OT1 be set such that a separation distance D1 and a separation distance D2 are each set to be greater than a predetermined distance. The separation distance D1 is the distance between the obstacle B1 and the parallel portion W of the movement trajectory TR of the target preceding vehicle M2 that is parallel to the obstacle B1 and ranges from a point W1 to a point W2. The separation distance D2 is the distance between the obstacle B2 and the parallel portion W of the movement trajectory TR of the target preceding vehicle M2 that is parallel to the obstacle B2.

At this time, the post-change target route OT1 may be set such that the separation distance D between either of the obstacles B1 and B2 on the left and right sides, and the parallel portion W of the movement trajectory TR of the target preceding vehicle M2 that is parallel to the obstacle B1 or B2 is greater than a predetermined distance. As a result, when the separation distance at the parallel portion W between the other obstacle B1 or B2 and the post-change target route OT1 is less than the predetermined distance, travelling control of the own vehicle M1 may be stopped. In this case, the driver is preferably notified that travelling control of the own vehicle M1 is stopped.

As described above, when the obstacles B1 and B2 are present on the left and right sides of the own traffic lane L1, the post-change target route OT1 is set in a position at which the separation distances D1 and D2 are greater than the predetermined distance. The separation distances D1 and D2 are the distances between the obstacles B1 and B2 and the parallel portion W of the movement trajectory TR of the target preceding vehicle M2 that is parallel to the obstacles B1 and B2. As a result, travelling control of the own vehicle M1 can be performed in a state in which the predetermined separation distance D is ensured between the obstacles B1 and B2 on the left and right sides of the own traffic lane L1 and the own vehicle M1.

In addition, when the obstacles B1 and B2 are present on the left and right sides of the own traffic lane L1, travelling control of the own vehicle M1 for traveling on the target route OT may be stopped when the separation distance D that is greater than the predetermined distance cannot be ensured between the obstacles B1 and B2 and the post-change target route OT1. In this case as well, discomfort experienced by the driver in accompaniment with the own vehicle M1 moving close to the obstacles B1 and B2 can be suppressed. In this case, the driver is preferably notified that travelling control of the own vehicle M1 is stopped.

Figure 13:
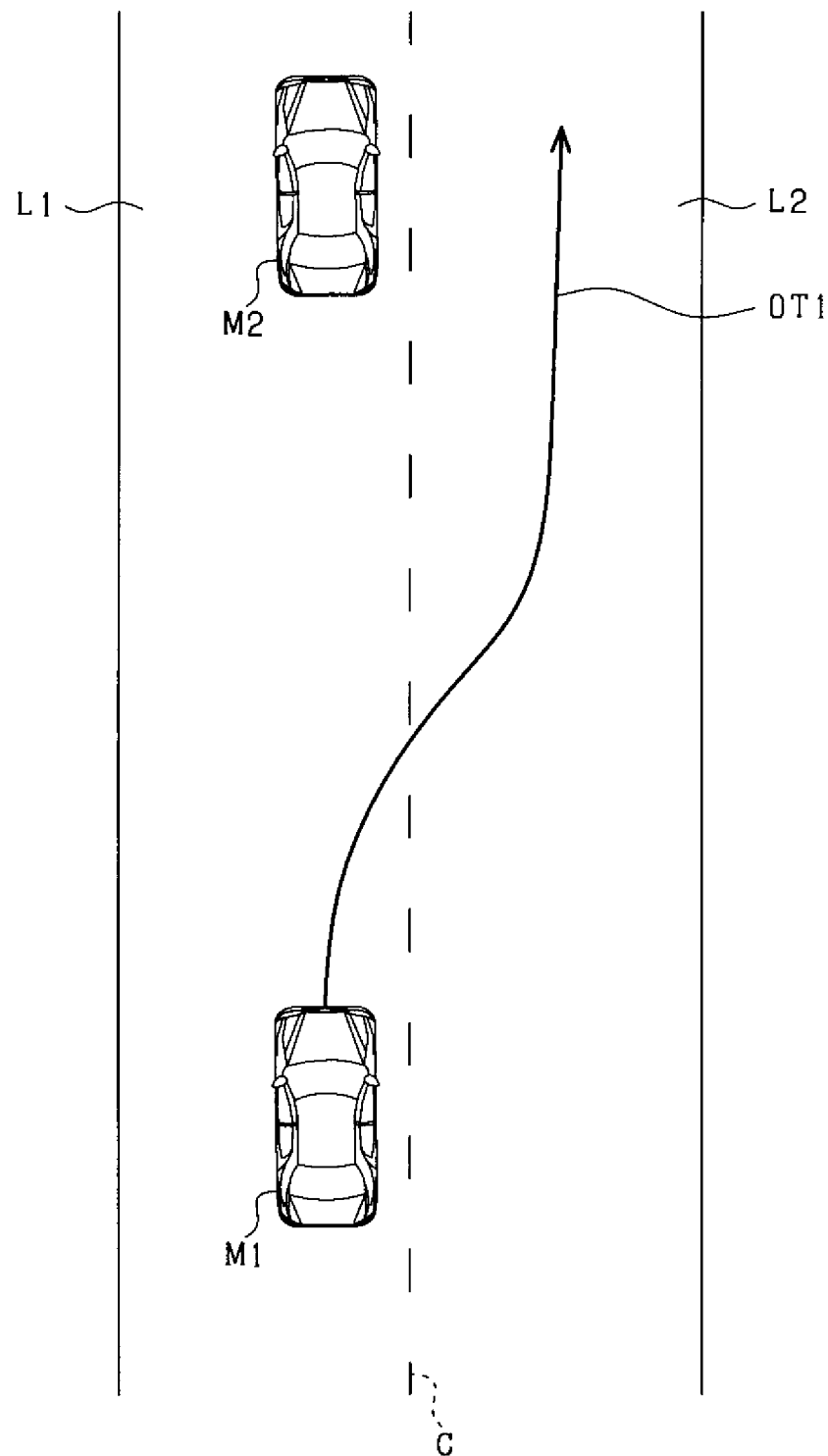
FIG. 13 is a planar view related to change in the target route when the own traffic lane is part of a plurality of traffic lanes.

As shown in FIG. 13, when the own traffic lane L1 is part of a plurality of traffic lanes, the separation distance D between the obstacle B1 and the parallel portion W of the target route OT that is parallel to the obstacle B1 can be ensured by the own vehicle M1 changing lanes to an adjacent traffic lane L2. However, when an obstacle is present in the adjacent traffic lane L2, distance from the obstacle is required to be ensured. Here, the target route OT may be changed under a condition that the own vehicle M1 is able to change lanes to the adjacent traffic lane L2 and an obstacle is not detected in the adjacent traffic lane L2.

For example, the vehicle control apparatus 20 determines whether or not a lane marking C between the own traffic lane L1 and the adjacent traffic lane L2 is of a type corresponding to a passing lane zone in which the vehicle is permitted to pass another vehicle. When determined that the lane marking C is of a type corresponding to a passing lane zone, the vehicle control apparatus 20 determines where or not an obstacle is detected in the adjacent traffic lane L2. When determined that an obstacle is not detected in the adjacent traffic lane L2, the vehicle control apparatus 20 changes the target route OT. When determined that an obstacle is detected in the adjacent traffic lane L2, the vehicle control apparatus 20 does not change the target route OT.

As described above, the target route OT is changed, taking advantage of the ability of the own vehicle M1 to change lanes. As a result, the separation distance D between the obstacle B1 and the parallel portion W of the target route OT that is parallel to the obstacle B1 can be ensured.

In FIG. 13, lane change may be permitted even when an obstacle is present in the adjacent traffic lane L2, should the predetermined separation distance D or more between the obstacle and the own vehicle M1 be ensured.

In the configuration above, whether or not to change the target route OT is determined based on a comparison between the separation distance D between the obstacle B1 and the parallel portion W of the movement trajectory TR of the target preceding vehicle M2 that is parallel to the obstacle 1, and the predetermined threshold Th. In addition, the target route OT may be changed based on an absolute value of the separation distance D, without the comparison using the threshold Th being performed.

What is claimed is:
1. A vehicle control apparatus comprising:
   a preceding vehicle detecting unit that detects a preceding vehicle ahead of an own vehicle;
   a movement trajectory acquiring unit that acquires a movement trajectory of a target preceding vehicle;

a target route setting unit that sets a target route on which the own vehicle is to travel, based on the movement trajectory of the target preceding vehicle;

an own vehicle control unit that performs travelling control of the own vehicle so as to follow the target preceding vehicle on the target route;

an obstacle detecting unit that detects an obstacle ahead of the own vehicle; and a target route changing unit that changes the target route by increasing a first separation distance between the obstacle and a parallel portion of the target route that is parallel to the obstacle.

2. The vehicle control apparatus according to claim 1, wherein:

the target route changing unit changes the target route so as to increase the first separation distance between the obstacle and the parallel portion of the target route that is parallel to the obstacle, when a second separation distance between the obstacle and the parallel portion of the movement trajectory of the target preceding vehicle that is parallel to the obstacle is less than a predetermined threshold.

3. The vehicle control apparatus according to claim 2, wherein:

the target route changing unit changes the target route based on an own vehicle speed.

4. The vehicle control apparatus according to claim 2, wherein:

the target route changing unit changes the target route so as to reduce an amount of deviation of the own vehicle from an own traffic lane that is a traffic lane in which the own vehicle is traveling, when the own vehicle deviates from the own traffic lane when the own vehicle travels on the changed target route.

5. The vehicle control apparatus according to claim 2, wherein:

the own vehicle control unit reduces a vehicle speed of the own vehicle when the own vehicle deviates from the own traffic lane when the own vehicle travels on the changed target route.

6. The vehicle control apparatus according to claim 2, wherein:

the target route changing unit changes the target route such that, when a lane marker marking the own traffic lane is a solid line, the own vehicle does not run outside of the solid line.

7. The vehicle control apparatus according to claim 2, wherein:

the target route changing unit changes the target route so as to increase the first separation distance between the obstacle and the parallel portion of the target route that is parallel to the obstacle, based on a difference between a vehicle width of the own vehicle and a vehicle width of the target preceding vehicle.

8. The vehicle control apparatus according to claim 1, wherein:

the target route changing unit gradually changes the target route set by the target route setting unit.

9. The vehicle control apparatus according to claim 1, wherein:

the target route changing unit stops changing the target route when the obstacle is no longer detected.

10. The vehicle control apparatus according to claim 1, further comprising:

a setting unit that sets an acquisition position of a second separation distance between the obstacle and the parallel portion of the movement trajectory of the target preceding vehicle that is parallel to the obstacle, based on the own vehicle speed, wherein the target route changing unit changes the target route so as to increase the second separation distance acquired at the acquisition point set by the setting unit.

11. The vehicle control apparatus according to claim 1, wherein:

the target route changing unit changes the target route based on a state of the obstacle.

12. The vehicle control apparatus according to claim 1, wherein:

the target route changing unit changes the target route, when the obstacle detecting unit detects the obstacles on both left and right sides of the own traffic lane, such that second separation distances between the obstacles on both left and right sides and the parallel portion of the movement trajectory of the target preceding vehicle that is parallel to the obstacles are greater than a predetermined distance.

13. The vehicle control apparatus according to claim 12, wherein:

the vehicle control unit stops travelling control of the own vehicle when, as a result of the target route being changed such that a second separation distance between either of the obstacles on both left and right sides and the parallel portion of the movement trajectory of the target preceding vehicle that is parallel to the obstacle is greater than the predetermined distance, a second separation distance between the other of the obstacles and the parallel portion of the movement trajectory of the target preceding vehicle that is parallel to the obstacle becomes less than the predetermined distance.

14. The vehicle control apparatus according to claim 1, wherein:

the vehicle control unit makes the own vehicle change lanes to an adjacent traffic lane that is adjacent to the own traffic lane when the obstacle is detected in the own traffic lane by the obstacle detecting unit, under a condition that a road on which the own vehicle is traveling has a plurality of traffic lanes and an obstacle is not detected in the adjacent traffic lane adjacent.

15. The vehicle control apparatus according to claim 1, wherein:

the obstacle detecting unit detects the obstacle that is in the own traffic lane or a location adjacent to the own traffic lane.

16. A vehicle control apparatus comprising:

a preceding vehicle detecting unit that detects a preceding vehicle ahead of an own vehicle;

a movement trajectory acquiring unit that acquires a movement trajectory of a target preceding vehicle;

a target route setting unit that sets a target route on which the own vehicle is to travel, based on the movement trajectory of the target preceding vehicle;

an own vehicle control unit that performs travelling control of the own vehicle so as to follow the target preceding vehicle on the target route;

an obstacle detecting unit that detects an obstacle ahead of the own vehicle; and a target route changing unit that changes the target route by increasing a first separation distance between the obstacle and a parallel portion of the target route that is parallel to the obstacle, wherein the own vehicle control unit stops travelling control of the own vehicle when the own vehicle deviates from an own traffic lane that is a traffic lane in which the own vehicle is traveling when the own vehicle travels on the changed target route.

17. A vehicle control apparatus comprising:
a preceding vehicle detecting unit that detects a preceding vehicle ahead of an own vehicle;
a movement trajectory acquiring unit that acquires a movement trajectory of a target preceding vehicle;
a target route setting unit that sets a target route on which the own vehicle is to travel, based on the movement trajectory of the target preceding vehicle;
an own vehicle control unit that performs travelling control of the own vehicle so as to follow the target preceding vehicle on the target route;
an obstacle detecting unit that detects an obstacle ahead of the own vehicle; and
a target route changing unit that changes the target route by increasing a first separation distance between the obstacle and a parallel portion of the target route that is parallel to the obstacle, wherein
the own vehicle control unit stops travelling control of the own vehicle when a second separation distance between the obstacle and the parallel portion of the movement trajectory of the target preceding vehicle that is parallel to the obstacle is less than a predetermined threshold.

* * * * *